(12) United States Patent
Chang

(10) Patent No.: US 6,188,201 B1
(45) Date of Patent: Feb. 13, 2001

(54) DEVICE FOR CONVERTING DIRECT CURRENT INPUT INTO MULTIPLE VOLTAGE OUTPUTS

(75) Inventor: David Chang, Taipei (TW)

(73) Assignee: Pacific Technology Co., Ltd., Taipei (TW)

( * ) Notice: Under 35 U.S.C. 154(b), the term of this patent shall be extended for 0 days.

(21) Appl. No.: 09/401,608

(22) Filed: Sep. 22, 1999

(51) Int. Cl.[7] ............................................. H01M 10/46
(52) U.S. Cl. ........................................................ 320/137
(58) Field of Search ............................ 323/267; 320/137, 320/140, 111

(56) References Cited

U.S. PATENT DOCUMENTS 4,665,473 * 5/1987 Onda et al. ............................ 323/267
5,119,013 * 6/1992 Sabroff .................................. 323/267

* cited by examiner

Primary Examiner—Edward H. Tso
(74) Attorney, Agent, or Firm—Baker Botts L.L.P.

(57) ABSTRACT

A power converting device is adapted for use with a battery pack. The power converting device includes a housing formed with a battery receiving space that is adapted for receiving the battery pack therein, a battery connector mounted on the housing inside the receiving space and adapted to be connected electrically with the battery pack when the battery pack is disposed inside the battery receiving space, at least two output connectors mounted on the housing and accessible from an exterior of the housing, and a power converting circuit mounted inside the housing and connected electrically to the battery connector and the output connectors. The power converting circuit is adapted to be connected electrically to the battery pack via the battery connector, and is adapted to convert electrical power of the battery pack into at least two voltage outputs that can be tapped at the output connectors, respectively.

2 Claims, 1 Drawing Sheet

DEVICE FOR CONVERTING DIRECT CURRENT INPUT INTO MULTIPLE VOLTAGE OUTPUTS

BACKGROUND OF THE INVENTION

1. Field of the Invention

The invention relates to a power converting device, more particularly to a power converting device that can convert input power into multiple voltage outputs.

2. Description of the Related Art

A conventional power converting device is used to convert alternating current input power into direct current output power. In one example, the conventional power converting device converts an external 110V/220V alternating current power into a 5V direct current voltage output suitable for application to an electrical appliance. However, since the conventional power converting device only provides a single converted voltage output, another power converting device is needed if the electrical appliance requires a 6V direct current voltage output. Moreover, the conventional power converting device can not be used outdoors where commercial external power is unavailable, thereby resulting in inconvenience during use.

SUMMARY OF THE INVENTION

Therefore, the object of the present invention is to provide a power converting device that can convert direct current input power into multiple voltage outputs.

According to the present invention, a power converting device is adapted for use with a battery pack. The power converting device includes a housing formed with a battery receiving space that is adapted for receiving the battery pack therein, a battery connector mounted on the housing inside the receiving space and adapted to be connected electrically with the battery pack when the battery pack is disposed inside the battery receiving space, at least two output connectors mounted on the housing and accessible from an exterior of the housing, and a power converting circuit mounted inside the housing and connected electrically to the battery connector and the output connectors. The power converting circuit is adapted to be connected electrically to the battery pack via the battery connector, and is adapted to convert electrical power of the battery pack into at least two voltage outputs that can be tapped at the output connectors, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
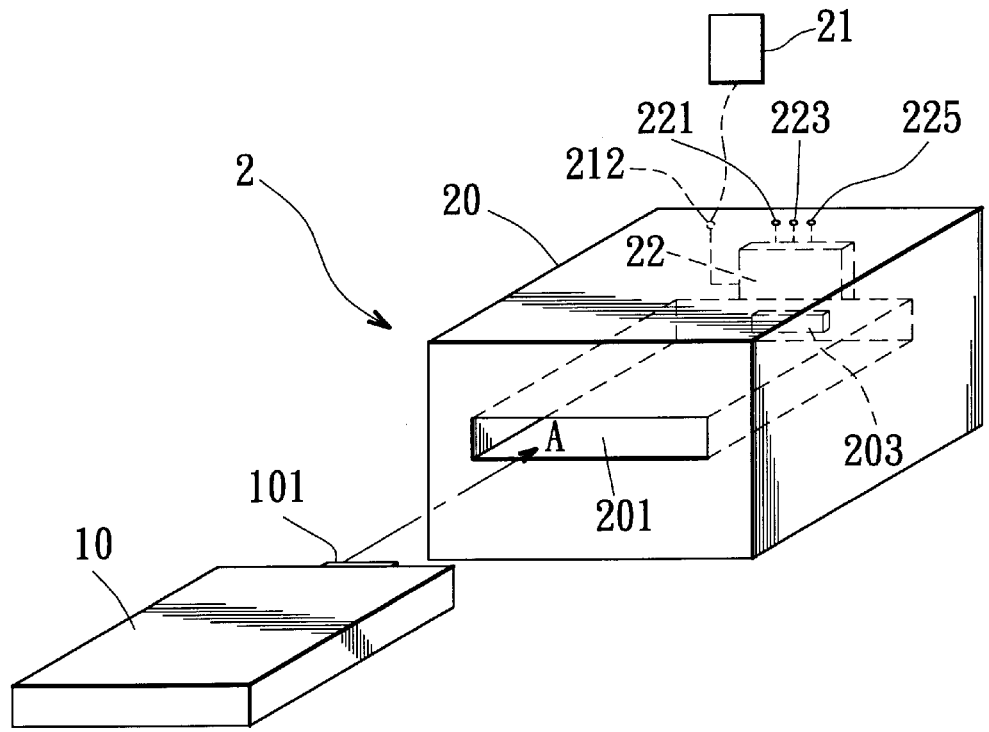
FIG. 1 is a perspective view of the preferred embodiment of a power converting device according to the present invention.
Figure 2:
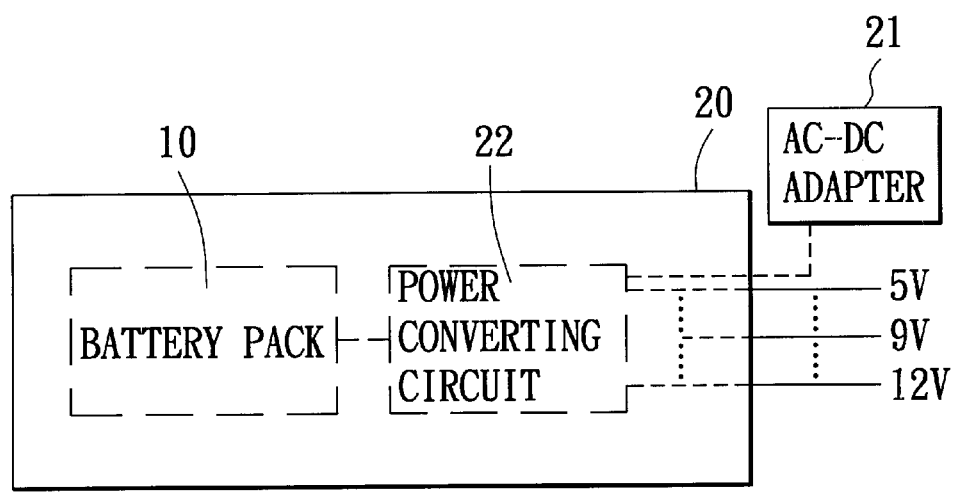
FIG. 2 is a schematic circuit block diagram illustrating the preferred embodiment.

Referring to FIGS. 1 and 2, according to the preferred embodiment of the present invention, a power converting device 2 is adapted for use with a battery pack 10, such as a mobile telephone battery pack or a portable computer battery pack, and is shown to include a housing 20, a battery connector 203, an input power connector 212, three output connectors 221, 223, 225, and a power converting circuit 22.

The housing 20 is formed with a battery receiving space 201 that is adapted to receive the battery pack 10 therein.

The battery connector 203 is mounted on the housing 20 inside the battery receiving space 201, and is adapted to connect electrically with the battery pack 10 via an electrical contact 101 of the latter when the battery pack 10 is disposed inside the battery receiving space 201.

The input power connector 212 is mounted on the housing 20, and is accessible from an exterior of the housing 20. The input power connector 212 is connected electrically to the power converting circuit 22, and is adapted to be connected electrically to a conventional AC-DC adapter 21 that converts commercial alternating current power into direct current input power.

The output connectors 221, 223, 225 are mounted on the housing 20 and are accessible from the exterior of the housing 20.

The power converting circuit 22 is mounted inside the housing 20 and is connected electrically to the battery connector 203 and the output connectors 221, 223, 225. The power converting circuit 22 is adapted to be connected electrically to the battery pack 10 via the battery connector 203 and the electrical contact 101 when the battery pack 10 is disposed inside the battery receiving space 201.

When the adapter 21 is not in use, and the battery pack 10 is inserted into the battery receiving space 201 in the direction of the arrow (A) as shown in FIG. 1, the power converting circuit 22 is adapted to convert the electrical power of the battery pack 10 into three predetermined voltage outputs, such as 5V, 9V, 12V, that can be tapped at the output connectors 221, 223, 225, respectively. In addition, when the adapter 21 is in use, and the battery pack 10 is not disposed in the battery receiving space 201, the power converting circuit 22 is adapted to convert the input power from the adapter 21 into the predetermined voltage outputs. Furthermore, when the adapter 21 is in use, and the battery pack, which is a rechargeable battery pack, is disposed in the battery receiving space 201, the power converting circuit 22 is adapted to recharge the battery pack 10 simultaneous with conversion of the input power from the adapter 21 into the predetermined voltage outputs.

One example of the power converting circuit 22 that can be used in the present invention is disclosed in a co-pending U.S. patent application, entitled "Power-Supplying Device", filed by the applicant of this application, the entire disclosure of which is incorporated herein by reference.

It has thus shown that the power converting device of this invention is capable of generating multiple voltage outputs and can be used even when commercial alternating current power is unavailable. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A power converting device adapted for use with a battery pack, comprising:

a housing formed with a battery receiving space that is adapted for receiving the battery pack therein, a battery connector mounted on said housing inside said receiving space and adapted to be connected electrically with the battery pack when the battery pack is disposed inside said battery receiving space;

at least two output connectors mounted on said housing and accessible from an exterior of said housing;

a power converting circuit mounted inside said housing and connected electrically to said battery connector and said output connectors, said power converting circuit being adapted to be connected electrically to the battery pack via said battery connector ad being adapted to convert electrical power of the battery pack into at least two voltage outputs that can be tapped at said output connectors, respectively; and an input power connector mounted on said housing and accessible from the exterior of said housing, said input power connector being connected electrically to said power converting circuit and being adapted to be connected electrically to an AC-DC adapter, said power converting circuit being adapted to convert input power from the adapter into said at least two voltage outputs when the adapter is connected electrically to said input power connector, wherein the battery pack being a rechargeable battery pack, wherein said power converting circuit is adapted to recharge the battery pack simultaneous with conversion of the input power from the adapter into said at least two voltage outputs when the adapter is connected electrically to said input power connector and the battery pack is disposed in said battery receiving space.

2. The power converting device as claimed in claim 1, wherein said at least two voltage outputs are predetermined.

* * * * *